United States Patent [19]

Taylor

[11] Patent Number: 4,595,301
[45] Date of Patent: Jun. 17, 1986

[54] SLIP BEZEL FOR ADJUSTABLE GAUGE

[75] Inventor: Carl A. Taylor, Carrollton, Tex.

[73] Assignee: Rochester Gauges, Inc., Dallas, Tex.

[21] Appl. No.: 679,693

[22] Filed: Dec. 10, 1984

[51] Int. Cl.$^4$ .......................... G01K 1/08; G01K 5/62
[52] U.S. Cl. ..................................... 374/207; 73/431; 374/208
[58] Field of Search .............. 374/205, 207, 148, 198; 73/431; 116/291, 292

[56] References Cited

U.S. PATENT DOCUMENTS

| | | | |
|---|---|---|---|
| 1,637,050 | 7/1927 | Rankin | 374/198 |
| 2,597,939 | 5/1952 | Lamb | 116/291 |
| 2,748,225 | 5/1956 | Kautz | 374/208 X |
| 2,988,041 | 6/1961 | Schmitz, Jr. et al. | 116/292 |
| 3,122,018 | 2/1964 | Freeman et al. | 374/207 |
| 3,124,003 | 3/1964 | Gorgens | 374/207 X |
| 3,226,836 | 1/1966 | Bond | 73/431 |
| 3,259,144 | 7/1966 | Taplin | 374/208 X |
| 3,279,257 | 10/1966 | Hunt | 374/207 X |
| 3,383,925 | 5/1968 | Nelson | 73/431 |
| 4,154,110 | 5/1979 | Peart et al. | 73/431 |

Primary Examiner—Daniel M. Yasich
Attorney, Agent, or Firm—Richards, Harris, Medlock & Andrews

[57] ABSTRACT

A circular temperature gauge includes tubing which encloses a temperature sensor and a housing which encloses a needle connected to the sensor and a dial connected to the housing. The housing is secured with respect to the tubing such that the housing can be rotated to calibrate the indicator needle with respect to the dial. A slip bezel is mounted on the periphery of the circular housing. The force required to rotate the bezel with respect to the housing is less than the force required to rotate the housing with respect to the tubing. This prevents a worker who is in the process of installing the gauge from inadvertently rotating the housing with respect to the tubing and substantially miscalibrating the gauge.

11 Claims, 3 Drawing Figures

SLIP BEZEL FOR ADJUSTABLE GAUGE

TECHNICAL FIELD

The present invention pertains in general to indicator gauges, such as thermometers, and in particular to such a gauge which can be manually calibrated while installed.

BACKGROUND OF THE INVENTION

Circular dial thermometers are widely used in applications where the thermometer is mounted by means of screw threads and includes a tubular enclosure for supporting a temperature sensor. The tubular enclosure extends into the medium which is to be measured. The temperature, or other parameter, is indicated by the operation of a needle within a circular housing.

Such thermometers as described above have been developed to include a feature for calibrating the temperature reading. The housing is designed to rotate relative to the tube containing the sensor element. The dial of the meter is connected to the housing and the indicator needle is connected to the temperature sensor. Therefore when the housing is rotated relative to the tubular enclosure for the sensor, the dial can be adjusted to be at any point relative to the needle. Thus, after installation, the gauge can be heated to a known temperature such that the housing can then be rotated to place the dial at the correct position relation to the needle. The temperature gauges are typically calibrated at the factory before shipment. Therefore the ultimate calibration at the installation site is minor. However, at the time of installation it is frequently the case that the workman installing the meter uses the housing as a grip for threading the meter into the installation opening. In doing so, especially when the threads become tight, the workman may twist the housing relative to the sensor and needle and this can drastically alter the accuracy of the gauge reading. When such twisting occurs the factory calibration is lost and the gauge must be recalibrated. The recalibration process can be expensive, inconvenient, and time consuming. A bushing is typically joined to the tubular enclosure and is provided with a hex fitting so that the workman can install the gauge without applying any force to the housing. Unfortunately, the bushing is frequently not used.

Therefore there exists a need for a circular gauge which has easy calibration after installation but is not readily subject to miscalibration as a result of incorrect handling of the gauge during installation.

SUMMARY OF THE INVENTION

A selected embodiment of the present invention is a gauge which includes a sensor, an enclosure for the sensor and an indicator needle which is supported and driven by the sensor. A circular housing has the needle and dial disposed therein. The housing is rotatably connected to the enclosure for the sensor. A first force is required to rotate the housing relative to the enclosure which rotates the dial relative to the needle. A slip bezel is mounted on the periphery of the circular housing. The slip bezel is rotatable relative to the housing in response to a second force which is less than the first force wherein rotation of the slip bezel relative to the enclosure does not alter the relationship of the needle to the dial. This prevents inadvertent miscalibration of the gauge by permitting the slip bezel to slip in its rotation about the housing.

BRIEF DESCRIPTION OF THE DRAWINGS

For a more complete understanding of the present invention and the advantages thereof, reference is now made to the following Description of the Preferred Embodiment taken in conjunction with the accompanying Drawings in which.

DESCRIPTION OF THE PREFERRED EMBODIMENT

Figure 1:
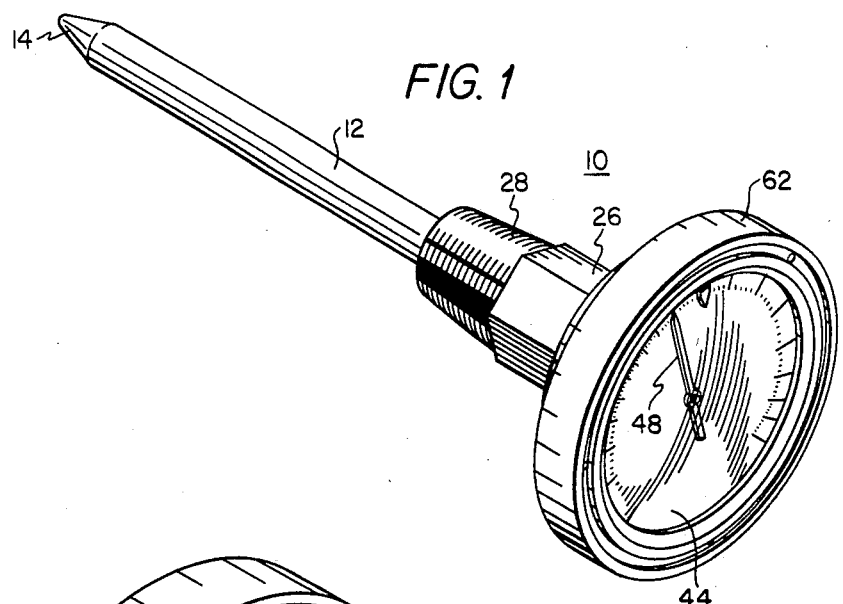
FIG. 1 is a perspective view of a gauge in accordance with the present invention.
Figure 2:
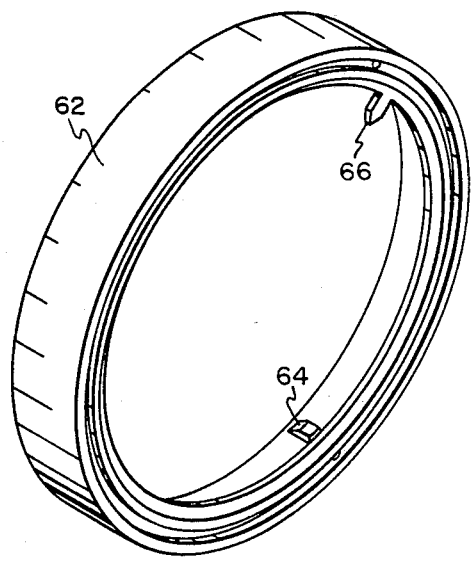
FIG. 2 is a perspective illustration of a bezel as used with the gauge shown in FIG. 1.
Figure 3:
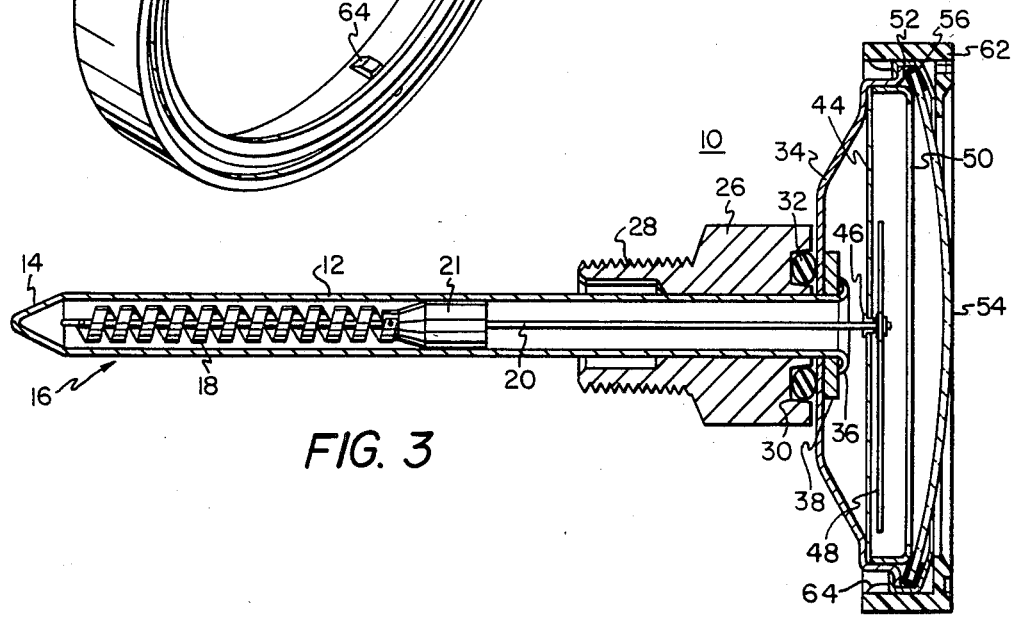
FIG. 3 is a sectional elevation view of the gauge as shown in FIG. 1.

Referring now to FIGS. 1, 2 and 3, there is illustrated a gauge 10 in accordance with the present invention. The gauge 10 includes a segment of tubing 12 which has a closed end 14. The tubing 12 with end 14 comprises a tubular enclosure. Within the tubing 12 there is provided a bimetal temperature sensor 16 which comprises a bimetallic strip 18, a shaft 20, and a fixed bearing 21.

The gauge 10 further includes a bushing 26 which has the tubing 12 permanently mounted therein. The bushing 26 is provided with external threads 28 which serve to secure the entire gauge 10 at an opening (not shown) having internal threads that engage the threads 28.

The bushing 26 has a circular opening 30 which receives an O-ring 32. A housing plate 34 has the tubing 12 extending therethrough. The tubing 12 has a rolled stake end 36 which applies pressure to a washer 38 that is mounted between the end 36 and the plate 34. The tubing stake end 36 drives the plate 34 against the O-ring 32 to provide a seal, and to provide resistance but not prevent relative rotation between bushing 26 and plate 34.

A dial 44 is mounted within the housing plate 34. The shaft 20 extends through the dial 44 where it is supported by a bearing 46. A needle 48 is mounted on the end of the shaft 20 opposite the bimetallic strip 18.

A clamp-on bezel 52 secures a crystal 54 to the peripheral edge of the circular housing plate 34. A channel gasket 56 is provided on the outer edge of the circular crystal 54. The crystal 54 holds a spacer 50 against the dial 44 securing dial 44 to plate 34.

A slip bezel 62 is snap-mounted on the outer periphery of the clamp-on bezel 52. The slip bezel 62 is held in position by a plurality of equally spaced tabs 64 which in assembly extend over the clamp-on bezel or portion 52 on the side opposite the crystal 54. The slip bezel 62 is preferably manufactured of a plastic which provides sufficient flex to bend and snap-fit over the outer periphery of the clamp-on bezel 52. The slip bezel 62 is further provided with a set pointer 66.

Operation of the gauge 10 in accordance with the present invention is now described in reference to the figures. The correct method for installing the gauge 10 is to initially engage the threads 28 to the internal threads of an opening (not shown). A wrench is then applied to the bushing 26 and the gauge 10 is rotated by the wrench until the threads 28 are securely engaged to the opening. If it is necessary to calibrate the gauge 10, the plate 34 is rotated relative to the tubing 12. This is possible by means of the O-ring 32 and the washer 38. The rotation of the housing plate 34 carries the dial 44 but does not move the tubing 12 and the connected needle 48. Therefore, the dial 44 can be moved to any position behind the needle 48. When the bimetallic strip 18 and the tubing 12 is exposed to a known temperature the housing plate 34 can be rotated such as to align the appropriate temperature indication point on the dial 44 with the needle 48.

In previous temperature gauges of this type, which do not include the slip bezel 62, it has been a common occurrence for the workman installing the gauge 10 to grasp the clamp-on bezel 52 for threading the threads 28 into the installation opening. When the threads 28 have become tight, the workman often continues to twist thereby rotating the housing plate 34 with respect to the tubing 12. This can cause extensive miscalibration of the gauge 10. However, with the slip bezel 62 of the present invention the workman does not have a grasp which can be used to rotate the gauge 10. Should he hold the slip bezel 62 and rotate it in an attempt to secure the threads 28, the slip bezel 62 will turn without rotating the housing plate 34. This is due to the fit of the slip bezel 62. The force required to rotate the slip bezel 62 with respect to the housing plate 34 is less than the force required to rotate the housing plate 34 with respect to the tubing 12. Therefore the workman is forced to use the bushing 26 in the proper manner to secure the gauge 10 in its installation.

The slip bezel 62 can further provide the function of recording a temperature setting by use of the set pointer 66.

When it becomes necessary to calibrate the gauge 10, the slip bezel 62 is removed to permit an operator to securely grasp the clamp-on bezel 52 and housing plate 34 and rotate the housing plate 34 with respect to the tubing 12 for calibrating gauge 10. The slip bezel 62 is then snap-fit back into position. In most instances a workman would not contemplate removing a portion of the gauge during installation. Thus, the slip bezel serves a function of protecting the instrument calibration when used in this manner.

In summary the present invention comprises a circular gauge 10 in which the dial 44 can be calibrated with respect to the needle 48 by rotation of the housing 34 which encloses the needle 48 and dial 44. A slip bezel 62 is provided on the outer periphery of the housing 34 such that the force required to rotate the slip bezel 62 is less than that required to move the dial 44 relative to the needle 48. The slip bezel 62 prevents inadvertent rotation and resulting miscalibration of the gauge 10.

Although one embodiment of the invention has been illustrated in the accompanying drawing and described in the foregoing Description of the Preferred Embodiment, it will be understood that the invention is not limited to the embodiment disclosed, but is capable of numerous rearrangements, modifications and substitutions of parts and elements without departing from the scope of the invention.

I claim:

1. A gauge, comprising:
a sensor,
an enclosure for said sensor,
a circular housing rotatably connected to said enclosure,
a dial disposed within said housing,
an indicator needle positioned within said housing, said needle connected to and driven by said sensor, said housing requiring a first force to rotate said housing relative to said enclosure thereby rotating said dial relative to said needle, and
a resilient slip bezel forcibly and detachably mounted on the periphery of said circular housing, said slip bezel having a plurality of spaced means coacting with a portion of said gauge and rotatable around the periphery of said housing in response to a second force which is less than said first force, wherein rotation of said slip bezel does not alter the relationship of said needle to said dial.

2. A gauge as recited in claim 1 wherein said sensor is a bimetallic temperature sensor.

3. A gauge as recited in claim 1 wherein said enclosure is a tubular element closed at one end thereof opposite said housing.

4. A gauge as recited in claim 1 wherein said housing includes a clamp-on bezel extending around the periphery of said housing, said clamp-on bezel securing said dial within said housing and providing a mount for said slip bezel.

5. A gauge as recited in claim 4 wherein said housing includes a circular crystal for protecting said needle and said dial, said crystal secured to said housing by said clamp-on bezel.

6. A gauge as recited in claim 1 wherein said slip bezel includes an inwardly directed pointer.

7. A gauge as recited in claim 1 wherein said slip bezel is fabricated of a flexible material and includes tabs for providing a snap-fit to said circular housing.

8. A temperature gauge, comprising:
an elongate temperature sensor,
a tube closed at one end and housing said sensor,
a circular housing rotatably connected to said tube,
a circular dial disposed within said housing,
an indicator needle positioned within said housing, said needle connected to and driven by said sensor, said housing requiring a first force to rotate said housing relative to said tube, thereby rotating said dial relative to said needle, and
a flexible slip bezel having a plurality of tabs coacting with a portion of said gauge to detachably mount said slip bezel on the periphery of said circular housing, said slip bezel rotatable around the periphery of said housing in response to a second force which is less than said first force, wherein rotation of said slip bezel does not alter the relationship of said needle to said dial.

9. A temperature gauge as recited in claim 8 wherein said tabs are equally spaced on the interior of said slip bezel.

10. A temperature gauge as recited in claim 8 wherein said slip bezel includes an inwardly directed pointer.

11. A gague, comprising:
a sensor,
a tubular element closed at open end thereof for enclosing said sensor,
a circular housing rotatably connected to said tubular element opposite said closed end thereof,
a clamp-on bezel extending around the periphery of said housing,
a dial secured within said housing by said clamp-on bezel,
an indicator needle positioned within said housing, said needle connected to and driven by said sensor, said housing requiring a first force to rotate said housing relative to said tubular element, thereby rotating said dial relative to said needle, and
a slip bezel fabricated of a flexible material and having an inwardly directed pointer and spaced tabs that snap-fit to said clamp-on bezel around the periphery of said housing, said slip bezel rotatable around the periphery of said housing in response to a second force which is less than said first force, wherein rotation of said slip bezel does not alter the relationship of said needle to said dial.

* * * * *

UNITED STATES PATENT AND TRADEMARK OFFICE
CERTIFICATE OF CORRECTION

PATENT NO. : 4,595,301
DATED : Jun. 17, 1986
INVENTOR(S) : Taylor

It is certified that error appears in the above-identified patent and that said Letters Patent is hereby corrected as shown below:

Column 1, line 30 after "position" insert --in--.

Column 4, line 48, "open end" should be --one end--.

Signed and Sealed this

Twenty-third Day of September 1986

[SEAL]

Attest:

DONALD J. QUIGG

Attesting Officer

Commissioner of Patents and Trademarks